Feb. 13, 1962 M. E. ROBINSON 3,021,477
METHOD AND APPARATUS FOR ESTIMATING FORAGE DENSITY
Filed Jan. 13, 1956 2 Sheets-Sheet 1
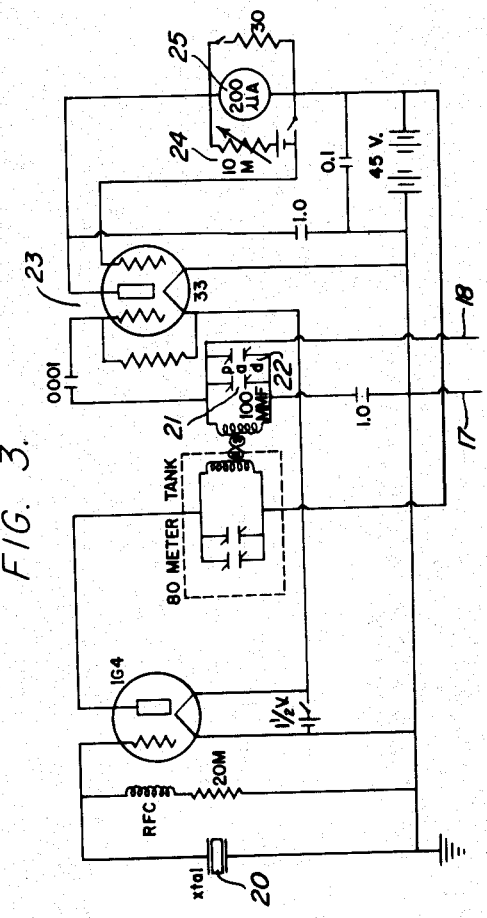
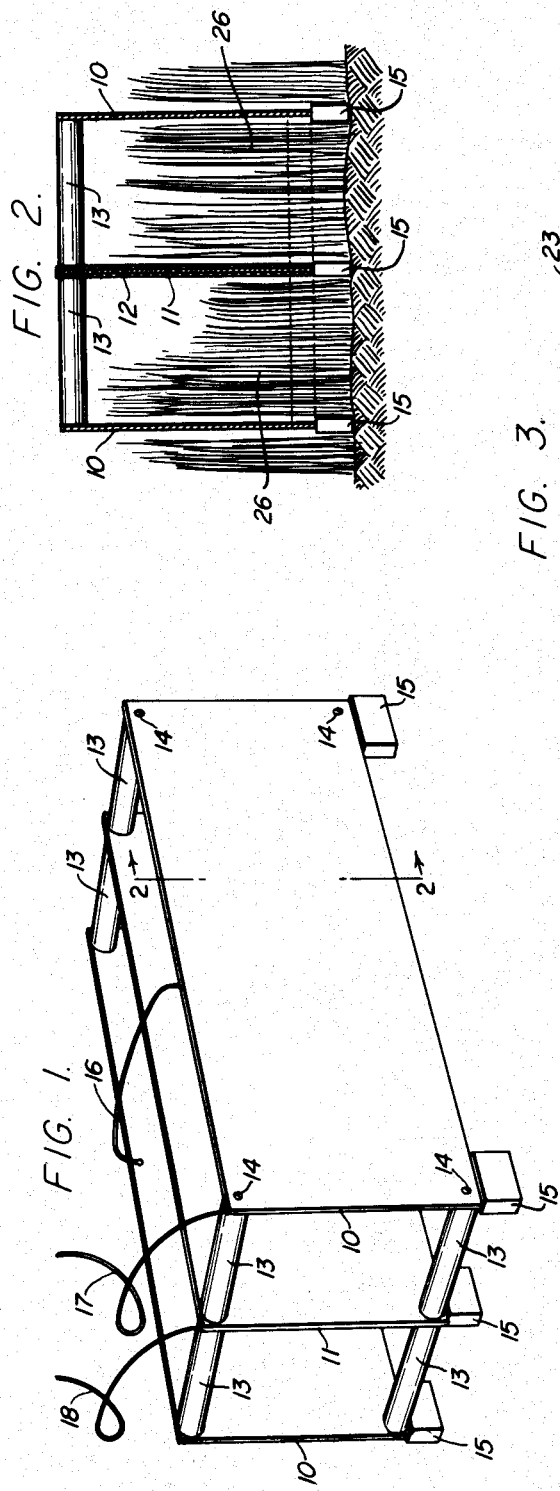
INVENTOR.
MAX E. ROBINSON
ATTORNEYS Feb. 13, 1962     M. E. ROBINSON     3,021,477
METHOD AND APPARATUS FOR ESTIMATING FORAGE DENSITY
Filed Jan. 13, 1956     2 Sheets-Sheet 2
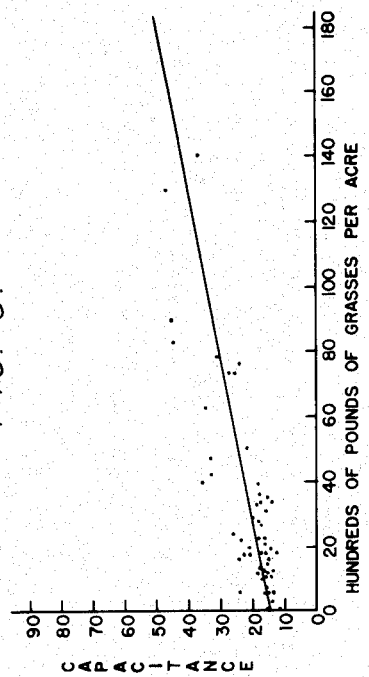
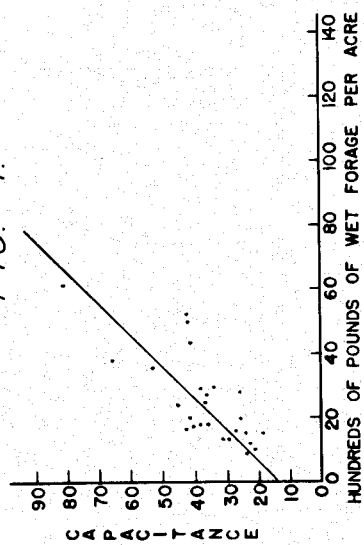
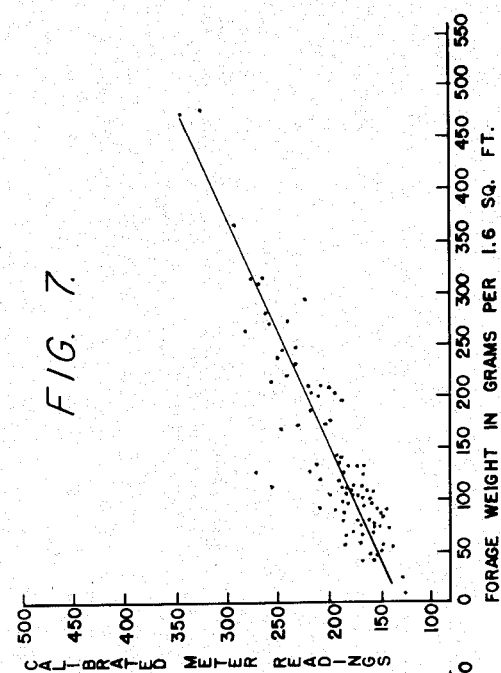
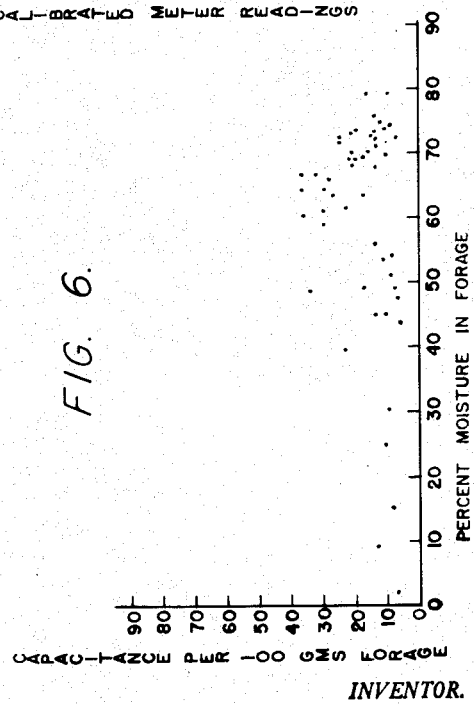
INVENTOR.
MAX E. ROBINSON
BY
ATTORNEYS

United States Patent Office 3,021,477
Patented Feb. 13, 1962

3,021,477
METHOD AND APPARATUS FOR ESTIMATING FORAGE DENSITY
Max E. Robinson, Rawalpindi, Pakistan
(573 W. 3rd North, Richfield, Utah)
Filed Jan. 13, 1956, Ser. No. 559,086
2 Claims. (Cl. 324—61)

This invention relates to methods for estimating forage density in the field and to apparatus therefor.

Conventional methods for estimating the quantity of dry forage which may be obtained from any given area of forage growing in the field involve excessively time-consuming procedures and are wasteful. The method most commonly employed involves the clipping and weighing of representative samples from test sites in the area concerned.

The present invention has as its principal object the provision of method and apparatus whereby there may be obtained, at representatives sites in any area concerned, meter readings which are indicative of the weight of dry forage per unit area, such readings being obtained rapidly and without the necessity of clipping or otherwise destroying any of the forage.

In the practice of the method, the electrical capacitance of the growing forage is measured at selected sampling sites within the area concerned, and an immediate indication of the forage density in that area is obtained by comparing such capacitances with a previously prepared, capacitance-weight per unit area chart. This can be most rapidly accomplished by calibrating the capacitance meter directly to weight per unit area, so that the desired results can be derived by direct reading of the meter.

Any electrical measurement circuit of suitable known type may be utilized for determining capacitance of the selected samples of growing forage. To facilitate use of such electrical capacitance measuring circuit, and as a phase of the apparatus invention hereof, a novel condenser unit is advantageously employed for sample testing purposes.

Further objects and features of the invention will become apparent from the following detailed description of both method and apparatus, the latter being illustrated in preferred form in the accompanying drawings.

In the drawings:

FIG. 1 represents a perspective view of the new electrical condenser unit;

FIG. 2, a vertical, transverse section taken on the line 2—2 of FIG. 1;

FIG. 3, a wiring diagram of a preferred electrical measurement circuit utilizing the condenser of FIG. 2;

FIG. 4, a graph made by plotting the dry weight of forbes and soggy wet grasses from a number of sites against the measured electrical capacitance of such forbes and soggy wet grasses as they stood at the sites;

FIG. 5, a similar graph made by plotting the dry weight of ordinary grasses from a number of sites against measured electrical capacitance of such grasses as they stood at the sites;

FIG. 6, a graph made by plotting the percent moisture found to be present in clipped samples of mixed varieties of forage subjected to tests against measured capacitance per 100 grams field weight of such forage samples; and FIG. 7, a graph made by plotting the respective weights of various clipped mixed forage samples against the calibrated variable condenser meter readings obtained from such samples.

Referring to the drawings:

As aforementioned, the method of the invention involves measurement of the electrical capacitances of representative forage samples standing in the field. Such measurements are most easily obtained by the use of apparatus forming one aspect of the invention.

The apparatus comprises an electrical measurement circuit and a therewith connected sampling condenser adapted for application to respective forage samples standing in the fields. The electrical measurement circuit of FIG. 3 and the sampling condenser of FIGS. 1 and 2 represent a preferred embodiment.

In the form illustrated, the sampling condenser comprises a series of side-by-side, mutually spaced condenser plates, of which alternate plates 10 are bare and uninsulated metal sheets. The plate 11 disposed therebetween is a similar metal sheet sheathed with electrical insulating material, preferably a plastic coating 12, FIG. 2, applied by dipping or spraying.

The series may comprise as many of the alternating condenser plates 10 and 11 as found suitable in any given instance of use, but will, in the majority of instances, comprise two of the plates 10 and a single insulated plate 11, as here shown.

The plates 10 and 11 are held rigidly apart by spacers 13 of electrical insulating material, preferably a breakage-resistant plastic for the sake of lightness and ease of fabrication, and are secured thereto by suitable means, such as screws 14.

The plates 10 and 11 are conveniently about 12 x 24 inches in size and are spaced about 6 inches apart, so that the sampling condenser unit is capable of comprehending the standing forage within a corresponding site to be tested, see FIG. 2.

In order to insulate the unit from the ground during testing operations and for excluding the normally uncropped lower portion of the forage from the testing scope thereof, electrically insulating feet 15 are provided at opposite ends of each of the condenser plates.

While it is preferred to utilize a pair of feet for each plate, it is obvious that only four feet need be employed for any one unit in order to accomplish the results desired. The height of such feet will depend upon how much of the lower portion of the standing forage is to be excluded from the testing operation.

The uninsulated plates 10 are electrically interconnected, as by means of a wire 16, and are connected into the measurement circuit in common by means of a single lead 17. A lead 18 serves the same purpose for the insulated plate 11.

The capacitance measuring circuit is preferably similar to that set forth in the article of Joel E. Fletcher entitled, "A Dielectric Method for Determining Soil Moisture," appearing in Soil Sci. Soc. Amer. Proc. 4:84–88 (1939), and includes a sampling circuit portion in the form of a constant frequency radio transmitter, inductively coupled to a balancing circuit portion in the form of a radio receiver.

As illustrated in FIG. 3, the sampling condenser unit of FIGS. 1 and 2 is connected into the measurement circuit at 17 and 18. The sampling circuit portion includes a crystal oscillator 20, of advantageously 4½ megacycles, and other components of a radio transmitter, as illustrated. The balancing circuit portion includes a variable condenser 21, which is manually adjustable by means of a graduated dial in conventional fashion for tuning the radio receiver to resonance with the transmitter. This forms, in effect, a capacitance meter for the apparatus. A companion condenser 22 permits adjustment back to zero position for different locations, different types of forage, and similar conditions.

Such balancing circuit portion also includes an amplifier 23 and a variable inductance coil 24 with microammeter 25 for tuning purposes.

*Method of field operation*

The capacitance forage meter is used in the field to sample vegetation in much the same manner that the conventional clipped quadrat method is used and as known by most of those trained in the plant sciences. Details of the quadrat method of sampling are available in many of the plant science reference books and journals. Quadrat samples may be located at random over the field to be sampled or in any other manner desired by the operator. Permanent quadrats may be marked and resampled as desired.

In the practice of the method, the circuit is tuned to resonance, with only air between the plates 10 and 11 of the condenser. The sampling condenser unit is set on the ground and over the standing forage 26 to be tested, as indicated in FIG. 2, and the dial of variable condenser or capacitance meter 21 is then adjusted for retuning the circuit into resonance. The capacitance of the forage sample undergoing test will be indicated by the setting of the dial of variable condenser 21. By noting the readings of the dial when the sampling condenser is empty and readings of the dial from samples taken in a field of forage, an estimate of the total forage production may be made. This may be done by clipping sufficient sampled plots of high and low production to establish a reference curve that may be used in estimating the production of the field in question or of other fields of like vegetation. An example of such a curve is shown in FIG. 7 for a field of grass-legume mixture with an average of 75% moisture.

For the purpose of utilizing the so obtained capacitance measurement to useful effect in accordance with the method the invention, the electrical capacitances of a variety of stands of forage of different types are obtained in similar manner, such stands of forage being thereafter clipped and dried, and the dry weights thereof determined. Such dry weights are then charted against the corresponding electrical capacitances of the same forage standing in the field, the charting being in terms of dry weight per unit area.

The charts so prepared may be referred to thereafter in the estimating operations pursuant to the method as described above, but it is preferable to calibrate the dial of the electrical capacitance meter or variable condenser 21, so that it reads directly in dry weight per unit area, for example, pounds per acre. This is done in well known manner. In this way, the reading given by the dial for the estimating operation described above will be in dry weight per unit area. Any number of readings deemed suitable for a given area to be estimated may be taken at selected sites therein, and the readings averaged to derive the final estimate for such area.

The graphs of FIGS. 4, 5, 6, and 7 are self-explanatory, and represent the results of actual tests carried out by means of the apparatus here illustrated and described.

Reverting to the construction of the sampling condenser unit, it should be noted that the purpose of the insulating coating or sheathing of the intermediate plate or plates 11 is to sharpen the end point reading of the capacitance meter when wet forage is being tested.

Whereas this invention is here set forth with respect to particular preferred practice and construction, it is to be understood that various changes may be made within the scope of the following claims, without departing from the essential contributions which I have made to the art.

I claim:

1. A quadrat method of estimating forage production, in which sampling quadrats are marked off in a field of standing forage whose production is to be estimated, comprising first establishing reference data derived by electrical measurements utilizing, as a capacitor dielectric, conventionally clipped and weighed forage of similar type from similar quadrats along with reference data derived by drying and weighing said clipped forage; making corresponding electrical measurements utilizing the standing forage of said sampling quadrats as a capacitor dielectric; and comparing the last-named electrical measurements with the said reference data.

2. A method of estimating density of forage standing in the field, comprising deriving a comparison standard for a unit area by measuring the electrical capacitance of the normally harvested portion of a variety of stands of forage, clipping and drying such normally harvested portions of said stands of forage, determining the dry weights thereof, and charting the resulting dry weights in terms of unit area against the measured electrical capacitances of the respective stands of forage; measuring the electrical capacitances of respective representative samples of forage standing in the area of forage to be estimated by standing mutually spaced plates of a sampling condenser in said area of forage a predetermined distance above ground level, to exclude the normally unharvested portion thereof, the normally harvested portion thereof standing upright between said condenser plates; comparing the derived measurements with similar measurements of said comparison standard, to determine the dry weights of the respective samples in terms of unit area; and utilizing the so determined dry weights of the respective samples to calculate the forage density of the area of standing forage concerned.

References Cited in the file of this patent

UNITED STATES PATENTS

| | | |
|---|---|---|
| 1,955,776 | Smith | Apr. 24, 1934 |
| 2,266,114 | Bartlett | Dec. 16, 1941 |
| 2,297,346 | Crist | Sept. 29, 1942 |
| 2,422,742 | Odessey | June 24, 1947 |
| 2,470,356 | MacKenzie | May 17, 1949 |
| 2,548,410 | Tyson | Apr. 10, 1951 |
| 2,696,893 | Richardson | Dec. 14, 1954 |
| 2,774,938 | Edinborgh | Dec. 18, 1956 |

OTHER REFERENCES

Nehru: "Experiments in Electro Farming," Bulletin 53, India Dept. of Agriculture, August, 1929.

Nelson et al.: "Determining Dielectric Properties of Grain" Agriculture Engineering, September, 1953; vol. 34, No. 9, pages 608–610.